Nov. 9, 1965  F. W. BROOKS  3,216,198
FLUID RESERVOIR FOR A MASTER CYLINDER ASSEMBLY
Filed July 3, 1963  2 Sheets-Sheet 1
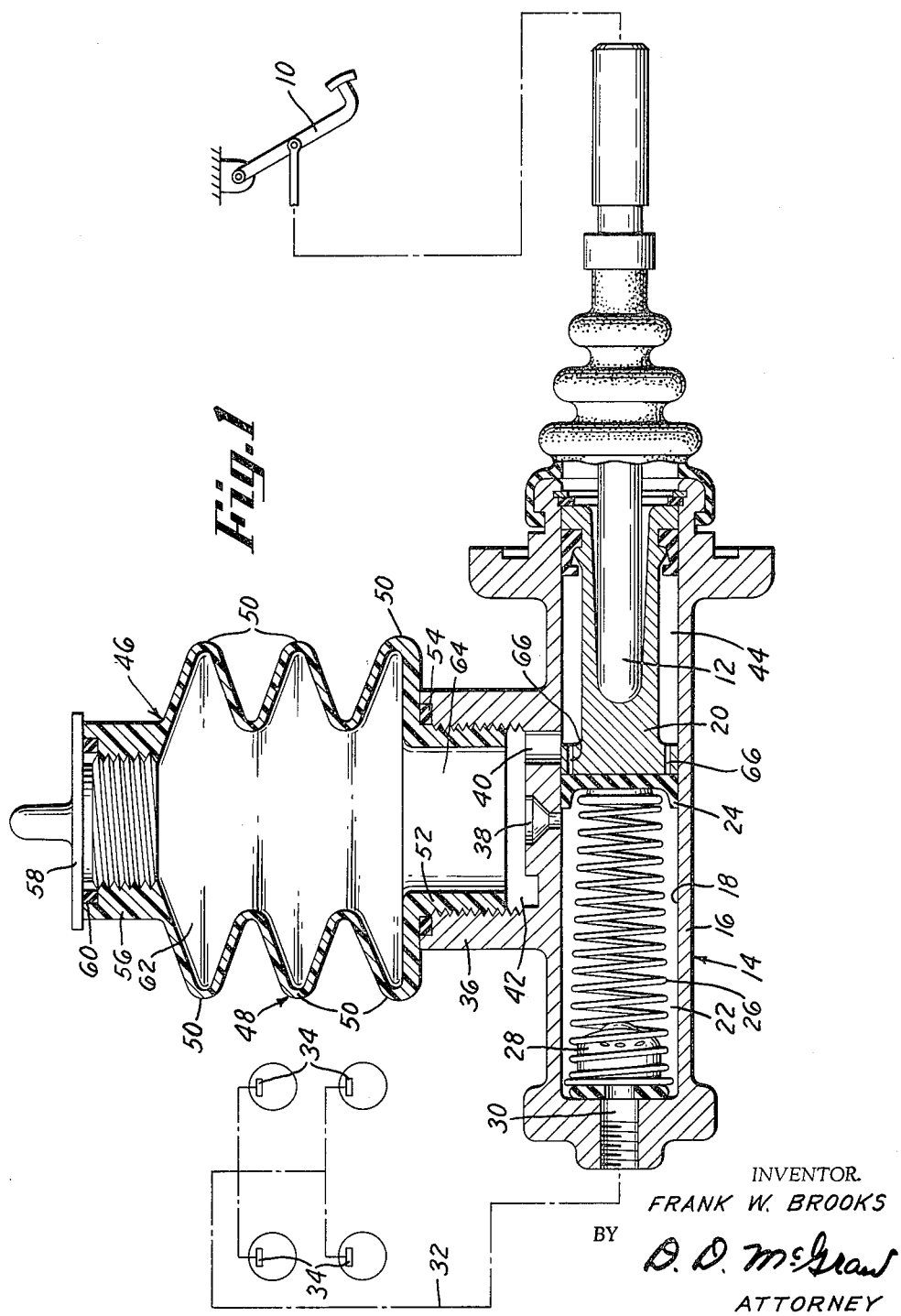
INVENTOR.
FRANK W. BROOKS
BY
D. D. McGraw
ATTORNEY

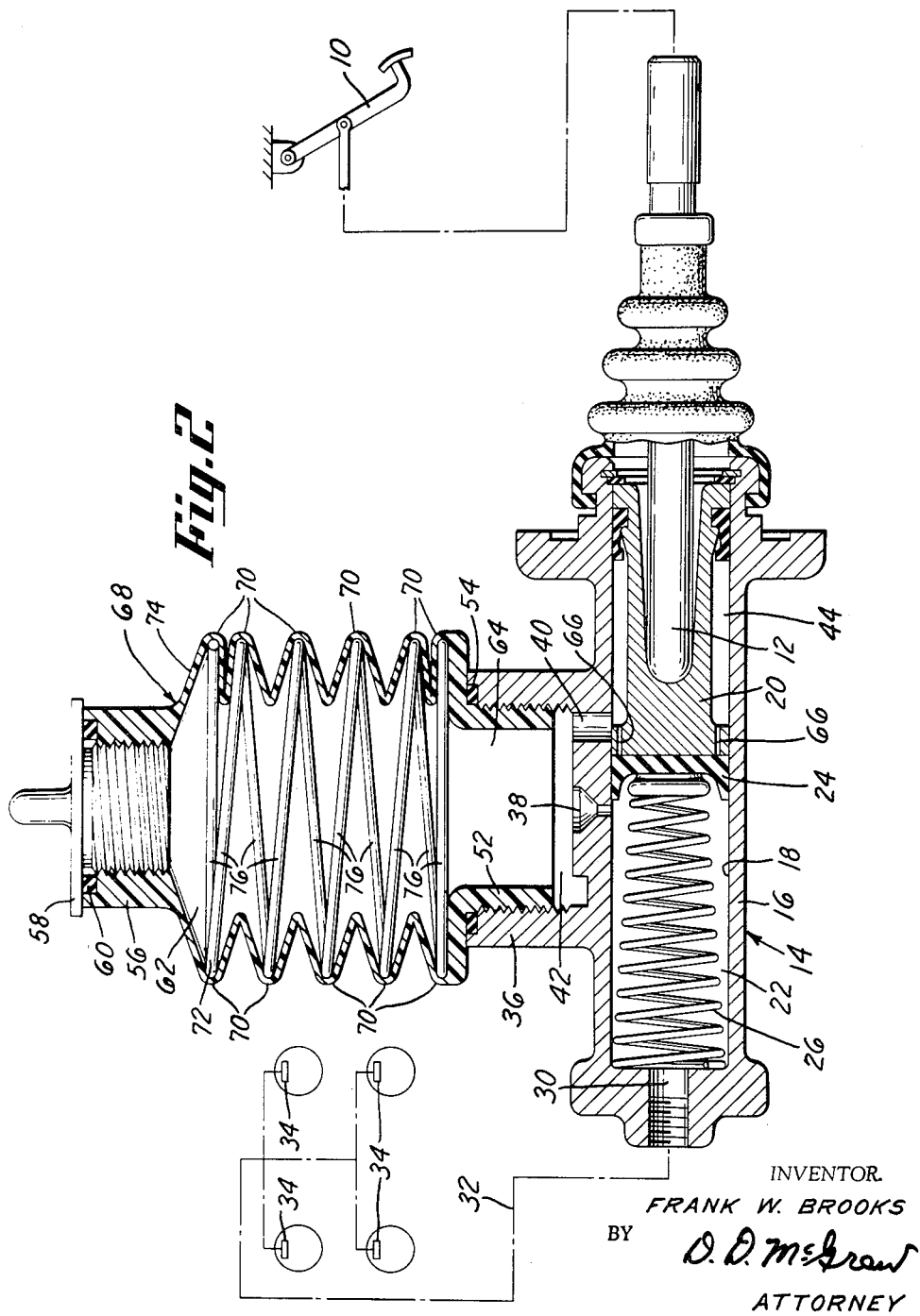

United States Patent Office 3,216,198
Patented Nov. 9, 1965

3,216,198
FLUID RESERVOIR FOR A MASTER
CYLINDER ASSEMBLY
Frank W. Brooks, Dayton, Ohio, assignor to General
Motors Corporation, Detroit, Mich., a corporation of
Delaware
Filed July 3, 1963, Ser. No. 292,566
4 Claims. (Cl. 60—54.6)

The invention relates to a variable capacity fluid reservoir for a master cylinder assembly, and more particularly to one which is sealed during operation of the assembly. Master cylinder units are commonly utilized to pressurize fluid to operate vehicle brakes and clutches. The units utilize hydraulic fluid which is contained in a reservoir to provide for fluid compensation. In normal operation of such units small amounts of fluid may be lost. In addition, small leaks in the pressurized operating system may result in fluid loss, and there must be a supply of hydraulic fluid readily available for use by the master cylinder in order to maintain operative the brakes, clutch or other mechanism being operated. It is also advantageous to keep the fluid in the reservoir free from contamination by foreign debris. It is desirable in many instances to keep the entire fluid system including the reservoir free from entrapped air.

It is now proposed to provide an efficient and inexpensive fluid reservoir having a variable capacity so that it can be filled with the desired quantity of fluid and will vary its capacity commensurate with the amount of fluid maintained in the reservoir. During the normal cycle of operation of any master cylinder, fluid is removed from the reservoir upon pressurizing action and is returned to the reservoir upon releasing action. Furthermore, the hydraulic fluid utilized may expand with an increase in temperature and the greater volume of fluid must be taken care of by the reservoir capacity.

The reservoir embodying the invention is of the convoluted collapsible type having an internal biasing force tending to decrease the capacity of the reservoir. Thus the reservoir may be filled to the desired capacity by expanding it during the filling operation, after which it is sealed to prevent the introduction of air, and the reservoir will collapse and expand as the volume of fluid therein changes. In one modification of the invention, the reservoir body acts as the spring which biases the body in a decreasing capacity direction. In another modification a separate spring may be utilized for this purpose, either with or without the spring-like action of the body. It is also desirable under some conditions to have the body reservoir made of a translucent or transparent material. Several such materials are now commercially available, through which the fluid in the reservoir may be viewed without removing the reservoir. This will permit inspection of the reservoir to determine whether or not any air has been entrapped therein during master cylinder operation after having entered the fluid pressure system at some other point. A reservoir embodying the invention is preferably easily installed and replaced while providing a positive seal to prevent fluid from entering or leaving the reservoir except through the compensating and bypass ports of the master cylinder.

In the drawings:

FIGURE 1 is a cross section view of a master cylinder having a reservoir embodying the invention and including a schematic diagram of a vehicle hydraulic brake system which may be operated utilizing fluid from the reservoir.

FIGURE 2 is similar to FIGURE 1 and illustrates a modified reservoir embodying the invention.

The vehicle brake system illustrated in the drawings includes a brake pedal 10 which is movable to actuate a master cylinder push rod 12. The master cylinder unit 14 includes a housing 16 in which is provided a bore 18. A pressurizing piston 20 is reciprocably received in bore 18 and is engaged by the push rod 12 to be actuated thereby. A pressurizing chamber 22 is defined by bore 18 and a piston primary cup 24 at the inner end of the piston 20. Unit 14 also includes the usual piston return spring 26, residual pressure valve 28 and the pressurized fluid outlet 30. A suitable conduit system 32 connected with outlet 30 conducts pressurized fluid to the wheel cylinders 34 which actuate the individual wheel brakes.

A boss 36 which is recessed and internally threaded is formed as a part of housing 16. Bypass compensating port 38 and compensating port 40 are provided in the lower end of the boss recess 42 and connect with the bore 18. Ports 38 and 40 are of the usual construction, with port 38 having a relatively small opening into bore 18 immediately forward of the forward end of cup 24 when the piston 20 is in the fully retracted position. Port 40 connects with the chamber 44 in back of the head of piston 20. The master cylinder therefore is typical of those in use in automotive vehicle today, and it is obvious that various master cylinder configurations based on the same principle of operation may be utilized.

The reservoir 46 has a body section 48 which is formed with convolutions 50 so that the body may have a bellows-like action in that it can expand and collapse under various conditions. For this purpose, the reservoir may be made of various suitable materials which are sufficiently flexible for this purpose. The body of reservoir 46 is also preferably made of a material having such spring characteristics that it will have an internal bias tending to collapse the reservoir in a decreasing capacity direction. The body includes a lower end 52 which provides an externally threaded connection mating with the internally threaded boss 36 to secure the reservoir to the master cylinder housing 16. A suitable seal 54 is positioned between the boss and the reservoir body to provide a fluid tight seal. The upper end 56 of the reservoir 46 is formed as an internally threaded boss which receives the filler cap 58. A suitable seal 60 may be provided between cap 58 and end 56 to seal the reservoir end when the cap is tightened in place. Thus the opening through the end 56 permits the filling of the reservoir chamber 62 with hydraulic fluid. Chamber 62 in turn connects through the opening 64 in the reservoir lower end 52 with the recess 42 in which ports 38 and 40 are located.

Assuming the presence of sufficient hydraulic fluid in the master cylinder unit 14 to completely fill the brake system including conduit system 32 and wheel cylinders 34, and thus at a level, for example, positioned at some point in opening 64, the reservoir chamber 62 may be filled by removing cap 58 and pouring hydraulic fluid therein while holding the reservoir 46 in a somewhat expanded position. Fluid may be filled completely to the top of reservoir 46 after which the filler cap 58 is tightly screwed in place so that chamber 62 contains virtually no air, but only hydraulic fluid. Since the fluid is not compressible, the spring-like action of the body 48 will merely maintain a slight pressure on the fluid contained therein, as well as the fluid in chambers 22 and 44. In some instances this pressure may be sufficient to permit the omission of the residual pressure valve 28, while in others a higher residual pressure may be desired than that obtained by use of the compressible force of the reservoir body.

When the master cylinder unit 14 is operated, piston 20 is moved to the left by operation of the brake pedal 10 and fluid is pressurized in chamber 22 to actuate the wheel cylinders 34. Upon release of the brake pedal, fluid is returned from the wheel cylinders 34 to the pressurizing chamber 22 and at the same time spring 26 moves cup 24 and piston 20 to the right. Since the fluid may have become somewhat heated during operation of the brakes it will expand, thus requiring a small amount of fluid to be displaced through the bypass port 38 and into the reservoir chamber 62. This will increase the volume required for fluid in chamber 62 and the reservoir body 48, being resilient, will expand to accommodate the increased volume. Should a fluid loss occur at one of the wheel cylinders 34, for example, there will be less fluid in the conduit system 32 and pressure chamber 22 than before, and this fluid loss must be made up by fluid from the reservoir chamber 62. This is accomplished in the usual manner by fluid passing through compensating port 40 and chamber 44, through passages 66 formed in the head of piston 20, and around cup 24 into chamber 22 as the piston 20 retracts under force of spring 26. This results in a decrease in the volume of fluid in chamber 62, and the spring biasing action of the reservoir body 48 causes the reservoir to decrease in capacity accordingly. Should air be taken into the system during operation and retraction of the piston 20, and find its way to the reservoir chamber 62, it will collect at the top of the reservoir. Thus the use of a translucent or transparent material for the reservoir will permit observation of the accumulation of any such air bubbles.

The modified reservoir 68 of FIGURE 2 is shown installed on the same master cylinder unit 14 but with the omission of residual pressure valve 28 shown in FIGURE 1. The modified reservoir 68 preferably has its convolutions 70 formed in a screw thread manner so that the coil type tension spring 72 can be threaded therein to provide the spring biasing force urging the reservoir in a decreasing capacity direction. This spring biasing force may be in addition to the spring biasing force of the reservoir body 74. In some instances it may be desirable to form the reservoir body of a material having no spring characteristics and in this instance spring 72 will provide the sole reservoir capacity decreasing force. The spring convolutions 76 are illustrated as fitting within the outer extremities of the reservoir body convolutions 70. In some instances it may be desirable to install the spring externally of the reservoir and in this instance the spring convolutions would fit within the inner extremities of the convolutions 70 and on the outside of the reservoir body.

The additional force provided by spring 72, and the force of the spring element, may be sufficient to provide the usually required 8–15 p.s.i. residual pressure in a typical brake system. Spring 72 in its free length preferably approaches a stack spring condition so that when it is expanded to the position shown in FIGURE 2, it exerts the necessary reservoir collapsing force.

I claim:

1. An expandable and collapsible fluid reservoir for a fluid utilization member normally operable to use fluid from and return fluid to said reservoir, said reservoir comprising a bellows-like housing having a screw thread-like convoluted configuration and a normally collapsive spring-loaded characteristic including an internal bias, a tension-acting coil spring having the convolutions thereof mating in screw-thread relation with said housing for maintaining residual pressure on fluid in said housing, means for fluid filling and sealing said housing at one end, and means for coupling the other end of said housing to said fluid utilization member in fluid transmittal relation.

2. The reservoir of claim 1, said spring being positioned internally of said housing and having the convolutions thereof mating with the inner surface of the radially outer extremities of the convolution of said housing.

3. In a pressurizing unit having pressurizing and fluid displacement chambers and fluid pressurizing and displacement means operable therein and fluid compensating port means, a fluid reservoir connected to said compensating port means and having a flexible convoluted housing internally spring biased to decrease the fluid capacity of said reservoir to maintain the fluid capacity thereof equal to the quantity of fluid therein as said quantity varies by transmittal of fluid through said compensating port means during operation of said pressurizing unit, and a convoluted tension spring reinforcing said reservoir housing.

4. The fluid reservoir of claim 3, said tension spring and said reservoir housing providing means maintaining residual pressure for said pressurizing chamber.

References Cited by the Examiner

UNITED STATES PATENTS

| 1,826,418 | 10/31 | Bragg et al. | 60—51 X |
| 2,006,487 | 7/35 | Sorenson | 60—54.6 |
| 2,038,898 | 4/36 | Goodyear et al. | 60—54.5 X |
| 2,952,128 | 9/60 | Highland | 60—54.6 |
| 3,059,671 | 10/62 | Kings | 60—54.6 X |

FOREIGN PATENTS 842,835  3/39  France.

JULIUS E. WEST, *Primary Examiner.*

EDGAR W. GEOGHEGAN, *Examiner.*